US009664219B2

(12) United States Patent
Haider et al.

(10) Patent No.: US 9,664,219 B2
(45) Date of Patent: May 30, 2017

(54) HOUSEHOLD APPLIANCE WITH ADJUSTABLE PEDESTAL

(75) Inventors: Gerhard Haider, Stockholm (SE); Alessandro Parmeggiani, Arese (IT)

(73) Assignee: Electrolux Home Products Corporation N.V., Brussels (BE)

( * ) Notice: Subject to any disclaimer, the term of this patent is extended or adjusted under 35 U.S.C. 154(b) by 753 days.

(21) Appl. No.: 13/820,340

(22) PCT Filed: Jul. 28, 2011

(86) PCT No.: PCT/EP2011/063038
§ 371 (c)(1), (2), (4) Date: Mar. 1, 2013

(87) PCT Pub. No.: WO2012/028399
PCT Pub. Date: Mar. 8, 2012

(65) Prior Publication Data
US 2013/0156497 A1    Jun. 20, 2013

(30) Foreign Application Priority Data
Sep. 3, 2010   (EP) ..................................... 10175214

(51) Int. Cl.
*F16B 7/18* (2006.01)
*F16L 15/00* (2006.01)
(Continued)

(52) U.S. Cl.
CPC ............ *F16B 12/00* (2013.01); *A47B 91/022* (2013.01); *A47B 91/024* (2013.01); *A47L 15/42* (2013.01);
(Continued)

(58) Field of Classification Search
CPC ..... A47B 91/022; A47B 91/024; A47L 15/42; A47L 15/4253; D06F 39/125;
(Continued)

(56) References Cited

U.S. PATENT DOCUMENTS 2,314,728 A * 3/1943 Murphy ..................... 411/247
3,175,795 A * 3/1965 Adams ...................... 248/188.4
(Continued)

FOREIGN PATENT DOCUMENTS

DE          4120751 A1    1/1993
WO    WO 2009/056449 A1    5/2009

OTHER PUBLICATIONS

International Searching Authority, International Search Report for International Application No. PCT/EP2011/063038, mailed Oct. 21, 2011, 3 pages, European Patent Office, The Netherlands.
(Continued)

*Primary Examiner* — Michael P Ferguson
*Assistant Examiner* — Nahid Amiri
(74) *Attorney, Agent, or Firm* — Alston & Bird LLP (57) ABSTRACT

Provided herein is a household appliance with at least one pedestal comprising a threaded rod which can be screwed into a corresponding threaded hole in a base of the household appliance in a longitudinal direction in order to reach a desired effective height of the pedestal. A snap nut made of a resilient material is provided having a threaded bore with a diameter and a thread fitting to the threaded rod so that the snap nut can be screwed along the longitudinal extension of the threaded rod, the snap nut further comprising a slot having a width that is less than the diameter of the bore and which defines a lateral opening of the bore wherein the width of the slot and the resiliency of the material allows the snap nut to be snapped from the side onto the threaded rod.

23 Claims, 6 Drawing Sheets (51) Int. Cl.
   *F16B 12/00* (2006.01)
   *A47B 91/02* (2006.01)
   *A47L 15/42* (2006.01)
   *D06F 39/12* (2006.01)
   *D06F 58/20* (2006.01)
   *F16B 37/08* (2006.01)

(52) U.S. Cl.
   CPC ........ *A47L 15/4253* (2013.01); *D06F 39/125* (2013.01); *D06F 58/20* (2013.01); *F16B 37/0878* (2013.01); *Y10T 403/4694* (2015.01); *Y10T 403/68* (2015.01)

(58) Field of Classification Search
   CPC ...... D06F 58/20; F16B 12/00; F16B 37/0878; Y10T 403/68; Y10T 403/4694
   USPC ....... 403/240, 242, 243, 249, 250, 256, 258, 403/259, 260, 261, 262, 263
   See application file for complete search history.

(56) References Cited

U.S. PATENT DOCUMENTS

| | | | | |
|---|---|---|---|---|
| 3,565,377 | A * | 2/1971 | Schreyer | 248/188.4 |
| 3,868,079 | A | 2/1975 | Johnson | |
| 4,449,876 | A * | 5/1984 | Glanton | 410/151 |
| 5,697,586 | A * | 12/1997 | Lybarger | 248/188.4 |
| 6,146,076 | A | 11/2000 | Bodin | |
| 7,287,732 | B2 * | 10/2007 | Balistreri | 248/188.4 |
| 7,902,948 | B2 * | 3/2011 | Luders | H01H 9/346 218/146 |
| 8,220,760 | B2 * | 7/2012 | Fetzer et al. | 248/188.4 |
| 8,579,568 | B2 * | 11/2013 | Wenfeng et al. | 411/58 |

OTHER PUBLICATIONS

Extended European Search Report from corresponding European Patent Application No. 10175214.5 dated Feb. 17, 2011.
Written Opinion from corresponding International Application No. PCT/EP2011/063038, dated Oct. 21, 2011.

* cited by examiner

HOUSEHOLD APPLIANCE WITH ADJUSTABLE PEDESTAL

CROSS REFERENCE TO RELATED APPLICATIONS

This application is a national stage application, filed under 35 U.S.C. §371, of International Application No. PCT/EP2011/063038, filed Jul. 28, 2011, which claims priority to European Patent Application No. 10175214.5, filed Sep. 3, 2010, both of which are hereby incorporated by reference in their entirety.

FIELD OF THE INVENTION

The present invention relates to a household appliance with at least one pedestal comprising a threaded rod which can be screwed into a corresponding threaded hole in a base of the household appliance in a longitudinal direction in order to reach a desired effective height of the pedestal.

BRIEF SUMMARY OF THE INVENTION

Household appliances like dishwashers, washing machines, household ovens, refrigerators or tumble dryers which have height adjustable pedestals are known in the art. By means of pedestals with threaded rods, the position or height of the household appliance can be adapted to different heights of worktops of kitchens. Depending on how far the threaded rod is screwed into the corresponding threaded hole of the base of the household appliance, the body of the household appliance can be moved in a vertical direction. In addition or alternatively such adjustable pedestals or feet can be used to level the household appliance. Such a household appliance is disclosed in WO 2009/056449 A1.

A disadvantage of such an adjustable pedestal is the fact that the pedestal together with the threaded rod tends to get unstable when unscrewed out of the base of the household appliance beyond a certain length. The pedestal hence gets swiveled or tilted especially e.g. when such a household appliance is moved across a tiled floor. The limited length along which the threaded rod can be unscrewed out of the base of the household appliance or the corresponding threaded hole in the base hence limits the range over which the household appliance can be adjusted in its height. This is particularly the case because the length of the used threaded rods is also limited since for shipping the household appliance or the usage of the household appliance in combination with a rather low worktop of a kitchen the threaded rods need to be screwed nearly completely into the base of the household appliance. Hence, the used threaded rods need to be rather short or the corresponding space that has to be provided within the household appliance for receiving longer rods has to be relatively high. In the latter case this space is then lost for other purposes, which means that for example the washing chamber of a respective dishwasher needs to be smaller in volume which clearly is a further disadvantage.

It is hence an object of the present invention to provide a household appliance with at least one pedestal that can be adjusted in its height but which overcomes the above disadvantages.

This object is solved by a household appliance where a snap nut made of a resilient material is provided having a threaded bore with a diameter and a thread fitting to the threaded rod so that the snap nut can be screwed along the longitudinal extension of the threaded rod. According to the invention, the snap nut comprises a slot having a width that is less than the diameter of the bore and which defines the lateral opening of the bore wherein the width of the slot and the resiliency of the material allows the snap nut to be snapped from the side onto the threaded rod.

The advantage of such an inventive household appliance is the fact that a snap nut is provided by means of which a threaded rod can be locked or tightened with respect to the base of the household appliance. A swiveling or tilting of the pedestal with respect to the base hence is suppressed also under conditions where the respective threaded rod is screwed only along a reduced or limited length into the corresponding threaded hole of the base. On the other hand, since the snap nut can be snapped from the side into the threaded rod, it is not necessary to completely unscrew the threaded rod and/or to lift the household appliance in order to screw the nut onto the rod. It is, hence, very easy to insert the nut onto the threaded rod and to lock the threaded rod or tighten it with respect to the base of the household appliance especially in cases where it turns out, that a greater lifting of the appliance becomes necessary.

Preferred embodiments of the present invention are defined in the dependent claims.

Preferably, the snap nut is designed so that it can be snapped from the side onto the threaded rod in a direction being substantially perpendicular to the longitudinal direction of the rod. This improves the easiness of the mounting of the snap nut onto the threaded rod. In particular, the pedestal and the snap nut can be designed such that the snap nut can be snapped onto the rod at any arbitrary position with respect to the longitudinal direction of the rod.

Optionally, the pedestal can further comprise a foot plate so as to avoid any scratches on a floor area onto which the household appliance is positioned. Since the snap nut can be snapped from the side onto the threaded rod such a foot plate neither doesn't need to be removed for screwing the nut onto the threaded rod nor makes it necessary to remove the complete pedestal for mounting the nut.

In a further preferred embodiment of the present invention the snap nut can be screwed along the threaded rod until it engages the base of the household appliance such that the threaded rod is locked against a stop face of the base of the household appliance in order to avoid a swiveling or a tilting of the pedestal with respect to the base. This offers not only a more stable mounting of the pedestal with respect to the base of the household appliance but also an unwanted unscrewing of the threaded rod due to e.g. a motion of the household appliance induced by moving parts of the appliance.

In a further preferred embodiment of the present invention the snap nut comprises a cylindrical section comprising in turn an according section of the slot and being coaxial with the bore and designed to engage with the base of the household appliance. This cylindrical section can have a tapered end which is designed to at least partially enter an entrance of the threaded hole in the base. Hence, the cylindrical section defines a sleeve or jacket comprising the threaded bore. Since only a part of the snap nut may be of such a cylindrical shape and on the other hand the whole snap nut needs to be slotted in order to make it snappable onto the threaded rod, the cylindrical section hence needs to be slotted along its entire length, however, the slot further also goes through any further section of the snap nut which might be not of such a cylindrical shape. The tapered end of the snap nut improves the locking of the snap nut and hence of the threaded rod with respect to the base of the household appliance since it provides for a certain wedging between the snap nut, the threaded rod and the base of the household appliance.

Such a tapered end can be designed so as to at least partially enter an entrance of the threaded hole in the base where the entrance can be the beginning of the threaded hole itself or a groove or notch which surrounds the threaded hole or the entrance of the threaded hole.

In a further preferred embodiment the entrance of the threaded hole is designed as a bore or sleeve provided in front of the threaded hole. Such a bore or sleeve can be designed so as to have the same diameter of the following threaded hole or to have a slightly larger diameter such that in both cases the tapered end of the snap nut at least partially enters the bore or sleeve in order to become wedged together with it.

In order to further improve the handling of such a snap nut the snap nut can comprise an end being opposed to its cylindrical section and facing away from the base of the household appliance where this end comprises at least one manual operation facility. As an example or option such an end can be designed as a slotted butterfly nut section with two radial extensions having a design and a length such that the snap nut can be turned by hand e.g. with two fingers without the need of a specific screw wrench or screw driver.

To remain the snap nut snappable onto the threaded rod the respective slot preferably extends through the cylindrical section and also through the manual operation facility.

Preferably, the snap nut is made of a plastic material optionally of a polyoximethylene (POM).

In a further inventive embodiment of the present invention an extension is provided which can be mounted onto or around the foot plate of the pedestal or directly onto the threaded rod without using the foot plate such that the effective length of the pedestal is further elongated. Hence, the range over which an according household appliance can be adapted in height is further extended whereas due to the locking of the threaded rod by means of the snap nut the stability of the pedestal is not affected.

A household appliance according to the present invention can be a dishwasher, a washing machine, a household oven, a refrigerator, or tumble dryer.

BRIEF DESCRIPTION OF THE SEVERAL VIEWS OF THE DRAWINGS

Preferred embodiments of the present invention are explained in further detail below by reference to the drawings, in which:

FIGS. 2 and 3 are schematic side views of a pedestal according to the present invention where FIG. 2 shows the pedestal prior to the mounting of the snap nut and FIG. 3 shows the pedestal with mounted and locked snap nut;

DETAILED DESCRIPTION OF THE INVENTION

Figure 1:
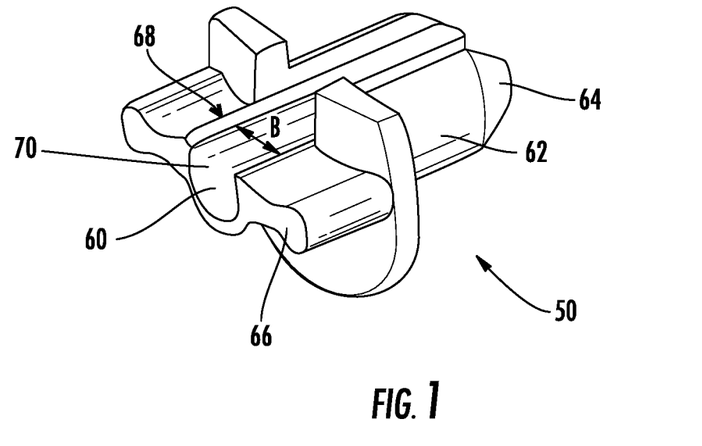
FIG. 1 is a perspective view of a snap nut according to the present invention.

FIG. 1 shows a snap nut 50 according to the present invention. The snap nut 50 comprises a threaded bore 60 by means of which the snap nut can be mounted onto a threaded rod of a pedestal. The snap nut 50, being made of a resilient material, comprises a slot 70 having a width (B) that is less than the diameter of the bore 60 and slot 70 defines a lateral opening of the bore 60 by means of which the snap nut can be clipped or snapped onto a threaded rod at an arbitrary position with respect to the longitudinal direction of such a rod. This has the advantage that the snap nut needs not to be screwed onto the rod starting at one end of the rod but can be clicked onto the rod at any position along its lateral extension. The snap nut 60 has two extensions 66 forming a manual operation facility 68 by means of which the snap nut can be turned and screwed along a rod with two fingers without the need of additional tools. Hence, the left part of snap nut 60 is designed like known butterfly nuts with the additional feature that it is slotted.

The right side of snap nut 60 is designed to have a cylindrical shape 62 with a tapered end 64. This side 62 of snap nut 50 is used to increase a locking engagement with a base of a household appliance as will be explained below by means of FIGS. 2 to 5. In other words, the tapered end 64 of the cylindrical section 62 improves the wedging between the snap nut 60 and the base of the household appliance.

Figure 2:
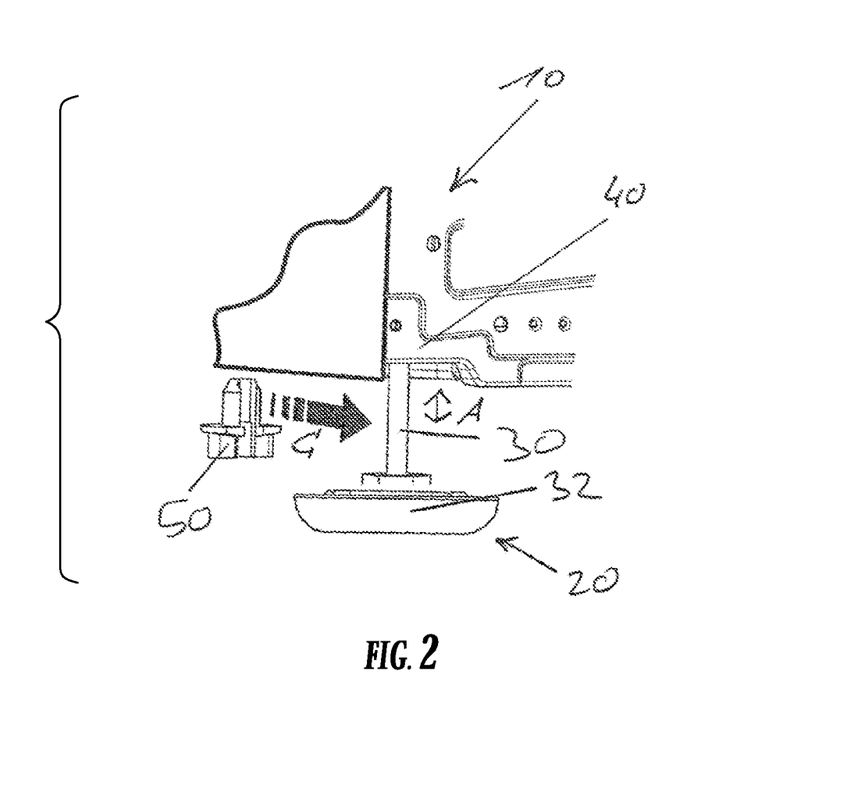

FIG. 2 is a side view onto a base 40 of a household appliance 10. A pedestal 20 is provided comprising a rod 30 which is screwed into the base 40 of household appliance 10. By screwing rod 30 in a direction A into base 40 or out of the base, the effective length of pedestal 20 can be adapted in order to level or lift the household appliance 10. In addition, pedestal 20 comprises a foot plate 32 in order to avoid a direct contact of the threaded rod 30 with a floor area. On the left side of FIG. 2 snap nut 50 of FIG. 1 is shown which is intended to be snapped onto the threaded rod 30 in a direction C (see arrow). Due to the slot 70 of snap nut 50 (see again FIG. 1) it is not necessary to remove the threaded rod 30 from the base 40 or the foot plate 32 from the rod 30 in order to mount the snap nut 50 on the threaded rod 30.

Figure 3:
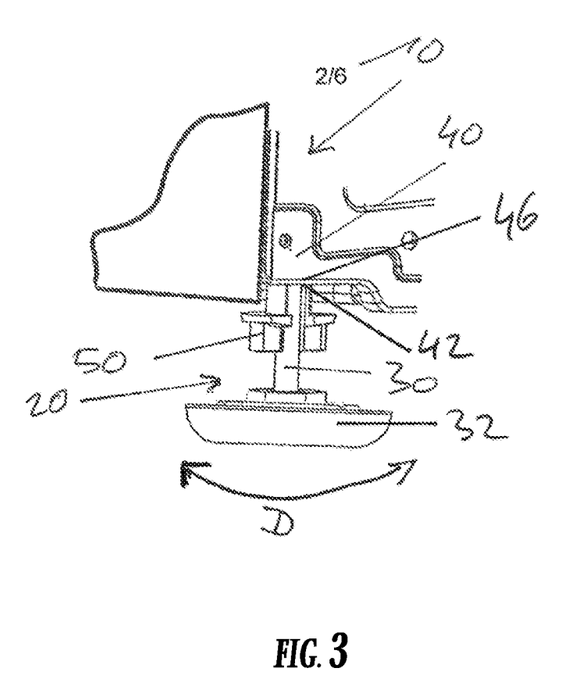

FIG. 3 shows a similar view onto the household appliance 10 as FIG. 2 where in FIG. 3 snap nut 50 is already snapped onto the threaded rod 30 and screwed in the direction versus the base 40 of the household appliance 10 (see direction "A" of FIG. 2). By means of snap nut 50 which is in locking engagement against the base 40 of the household appliance 10 or a stop face 46 of the base, pedestal 20 is locked or secured or tightened against a swiveling or tilting in a direction D especially in cases where rod 30 is screwed only along a limited length into the base 40 of the household appliance 10. In other words, due to the snap nut 50 the effective length over which the pedestal 20 can be adjusted is longer than without the usage of such a snap nut since threaded rod 30 can be again screwed out of the base 40 along a longer distance without the risk of a tilt or a bending or even a break of the rod in case that the household appliance 10 is e.g. shifted on the floor.

Figure 4:
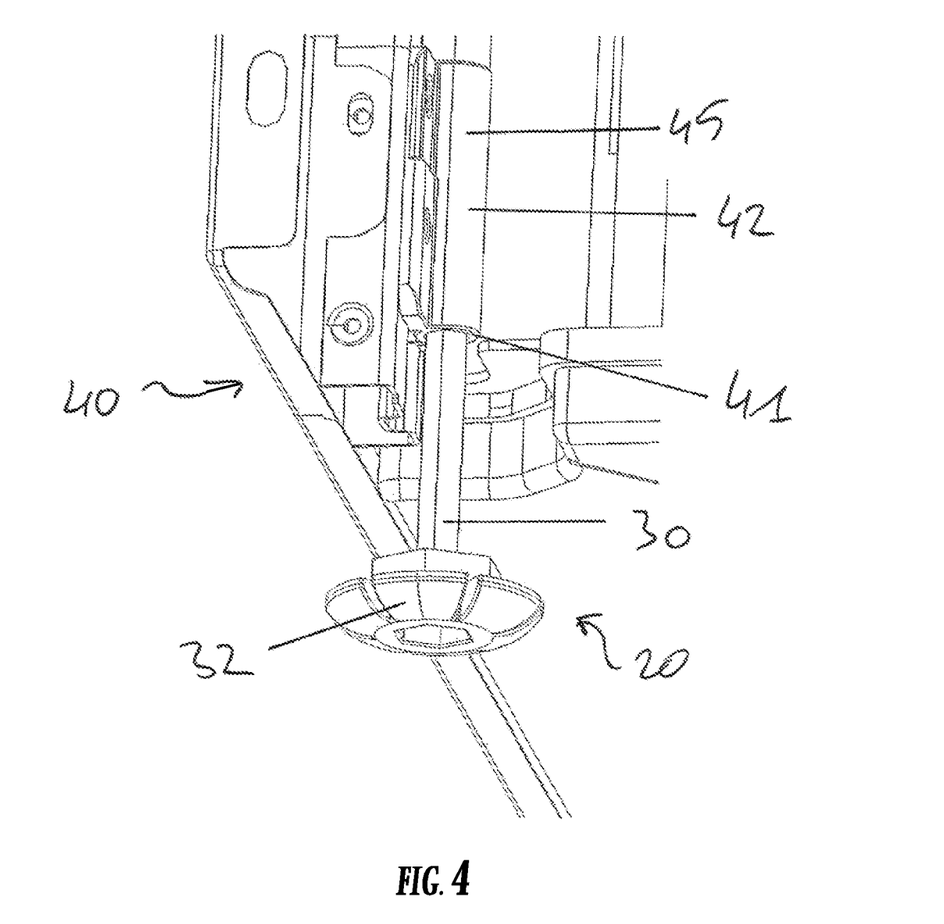
FIGS. 4 and 5 are perspective views from below onto the base of a household appliance according to the present invention showing a pedestal prior to the mounting of the snap nut.
Figure 5:
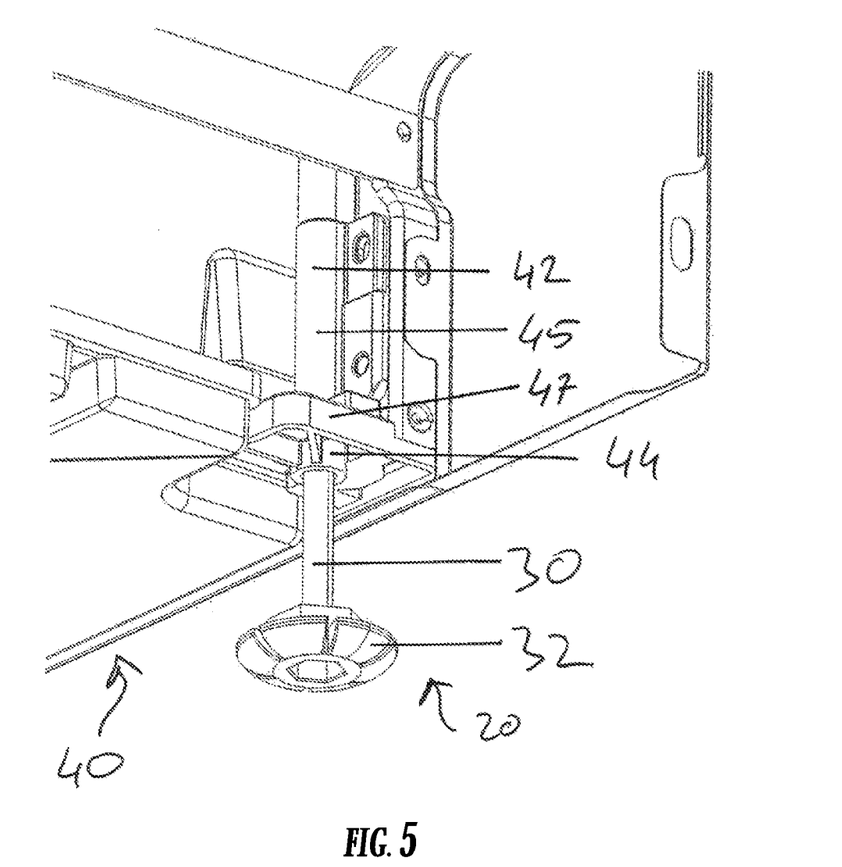

By means of the perspective views of FIG. 4 and FIG. 5 it is explained how the engagement between the snap nut 50 of FIG. 1 with the base 40 can be improved. Here, pedestal 20 is again shown prior to the mounting of the snap nut so as to provide a free sight onto the respective sections of the base 40.

As shown in FIG. 4 threaded rod 30 onto which foot plate 32 is mounted is screwed into a threaded hole 42 which is provided through a cylindrical mounting 45 within the base 40. The threaded hole 42 has an entrance 41 into which rod 30 enters. The entrance 41 can be designed in a way such that it provides a certain clearance to the rod 30 into which the tapered end 64 of the snap nut 50 of FIG. 1 can enter when the snap nut is mounted onto the rod 30 and screwed in an upper direction into the threaded hole 42 until the snap nut 50 or more precisely the tapered end 64 of the snap nut at least partially enters the entrance 41 of the hole 42. Hence, the optionally tapered end 64 of the cylindrical section 62 of snap nut 50 (see FIG. 1) improves the wedging between the snap nut (50) and the base 40.

Similar as FIG. 4, FIG. 5 shows a pedestal 20 which is screwed into a threaded hole 42 of the base 40 where again the snap nut 50 shown in FIG. 1 is not yet mounted onto the threaded rod 30 of the pedestal 20. When comparing with FIG. 4 one can see that in the embodiment of FIG. 5 in addition to the mounting 45 with threaded hole 42 a bearing 47 is provided which comprises a sleeve 44 being designed to receive the threaded rod 30 and which guides the threaded rod 30 versus the threaded hole 42 of mounting 45. The internal surface of sleeve 44 does not carry any thread, however, it is designed with respect to its width such that rod 30 can be plunged through it whereas it serves as an engaging or locking surface for the snap nut 50 of FIG. 1 when the snap nut is mounted onto the rod 30 and screwed in upper direction until it reaches sleeve 44 of bearing 47. Again a certain clearance between the internal surface of sleeve 44 and the threads of rod 30 can be provided such that the tapered end 64 of the cylindrical section 62 of the snap nut 50 of FIG. 1 can enter into this clearance so as to come into a wedged locking engagement with bearing 47.

Figure 6:
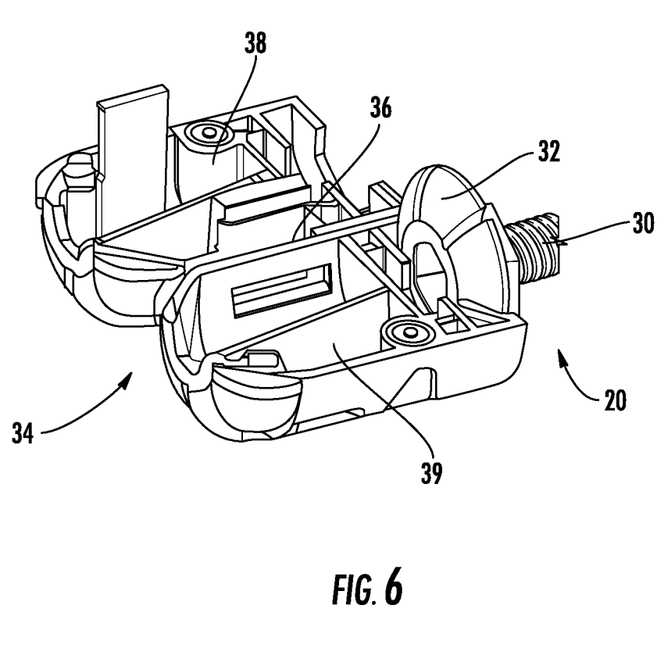
FIG. 6 shows a pedestal onto which an extension is going to be mounted.

FIG. 6 shows a pedestal 20 during the mounting of an extension 34. Extension 34 comprises two halves 38 and 39 which are connected by means of the joint 36 which can e.g. be a film joint. The extension 34 is designed to be mounted onto a foot plate 32 of pedestal 20 where the foot plate 32 in turn is mounted onto the threaded rod 30 of the pedestal. Extension 34 hence can be snapped onto the pedestal 20 in a way that firstly one half 39 is clicked onto the pedestal 20 followed by closing of the two halves 38 and 39 until a locking mechanism secures both halves 38 and 39 together so that an extension 34 is generated which has approximately a cylindrical shape.

Figure 7:
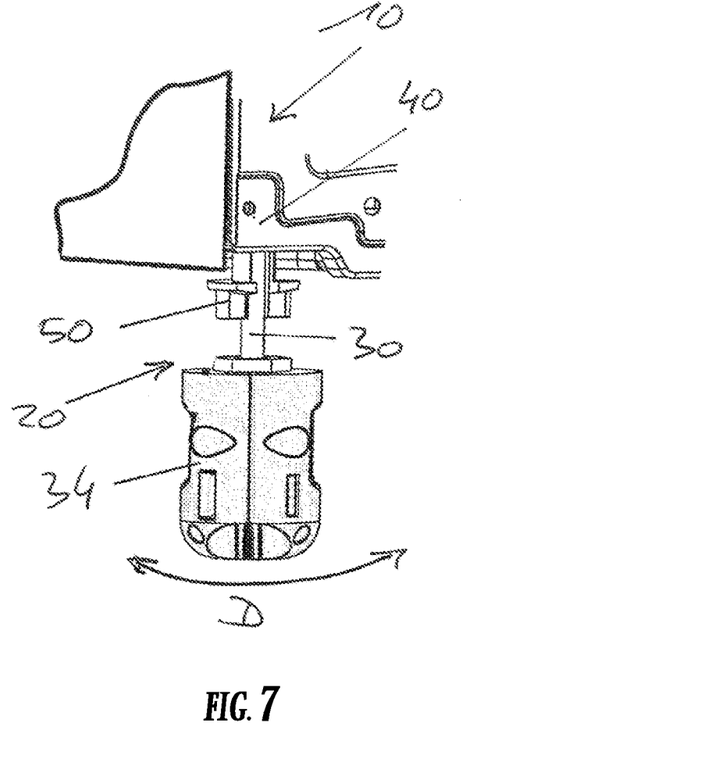
FIG. 7 shows a pedestal according to the present invention with mounted snap nut and elongation.

As can be seen in FIG. 7 in a perspective side view similar to FIG. 3 pedestal 20 can be elongated by means of such an extension 34 such that the effective length of the complete pedestal 20 in combination with extension 34 is longer than the length of the pedestal of FIG. 3. Hence, the effective height of the household appliance 10 of FIG. 7 cannot only be adjusted by screwing threaded rod 30 into or out from the base 40 but additionally by mounting the extension 34 onto the pedestal 20. This, however, is only possible due to snap nut 50 by means of which a threaded rod 30 is secured or locked with respect to the base 40 against a swiveling or tilting around its entrance into the base 40 (see arrow D).

In conclusion, the usage of snap nut 50 greatly improves the adjusting range of a pedestal 20 in comparison to a pedestal with the same rod length but without the option of a snap nut. This is not only the case because it is possible to screw rod 30 further out of the base 40 due to the locking by means of the snap nut 50 but also since the locking due to the snap nut 50 allows the usage of the extension 34 which otherwise would leverage a swiveling of the whole pedestal 20 beyond an acceptable level. With the design of nut 50 being a snap nut the locking of the pedestal 20 can be reached without a disassembling of the pedestal 20.

LIST OF REFERENCE SIGNS 10 household appliance
20 pedestal
30 rod
32 foot plate
34 extension
36 joint
38, 39 halve
40 base
41 entrance
42 threaded hole
44 sleeve
45 mounting
46 stop face
47 bearing
50 snap nut
60 bore
62 cylindrical section
64 tapered end
66 extension
68 butterfly nut
70 slot

The invention claimed is:

1. A household appliance with at least one pedestal comprising a threaded rod comprising a foot plate for at least partially supporting the household appliance, wherein the threaded rod is configured to be screwed into a corresponding threaded hole in a base of the household appliance in a longitudinal direction (A) in order to reach an effective height of the pedestal, characterized in that a snap nut made of a resilient material is provided having a threaded bore with a diameter and a thread fitting to the threaded rod to enable the snap nut to be screwed along a longitudinal extension of the threaded rod, the snap nut further comprising a slot having a width (B) that is less than the diameter of the bore and which defines a lateral opening of the bore wherein the width of the slot and the resiliency of the material allows the snap nut to be snapped from the side onto the threaded rod, and wherein an extension is provided which is configured to removably attach to the foot plate of the pedestal so as to elongate the effective height of the pedestal, wherein the extension defines a void and an opening connected to the void, wherein at least a portion of the foot plate is configured to be disposed in the void, and wherein at least one of the threaded rod or a second portion of the foot plate is configured to extend through the opening.

2. The household appliance according to claim 1, wherein the snap nut is configured to be snapped from the side onto the threaded rod in a direction (C) being substantially perpendicular to the longitudinal direction of the rod.

3. The household appliance according to claim 1, wherein the snap nut is configured to be snapped onto the threaded rod at any position along the longitudinal direction (A) of the rod.

4. The household appliance according to claim 1, wherein the foot plate mounted onto the end of the threaded rod is opposed to the base of the household appliance.

5. The household appliance according to claim 1, wherein the snap nut is configured to be screwed along the threaded rod until it engages the base of the household appliance such that the threaded rod is locked against a stop face of the base of the household appliance for avoiding a swivelling (D) of the pedestal with respect to the base.

6. The household appliance according to claim 5, wherein the snap nut comprises a cylindrical section comprising a section of the slot and being coaxial with the bore and designed to engage with the base of the household appliance and which has a tapered end which is designed to at least partially enter an entrance of the threaded hole in the base.

7. The household appliance according to claim 6, wherein the entrance is designed for receiving the tapered end of the snap nut and for engaging with the tapered end, wherein the entrance is surrounded by a groove.

8. The household appliance according to claim 6, wherein the entrance is designed for receiving the tapered end of the snap nut and for engaging with the tapered end, wherein the entrance is defined by a bore or sleeve provided in front of the threaded hole.

9. The household appliance according to claim 6, wherein the snap nut comprises an end being opposed to the cylindrical section and facing away from the base of the household appliance, the end comprising at least one manual operation facility, wherein the end is a slotted butterfly nut section with two radial extensions.

10. The household appliance according to claim 9, wherein the bore and the slot extend through the cylindrical section and the manual operation facility.

11. The household appliance according to claim 1, wherein the snap nut is made of plastic, wherein the plastic comprises polyoximethylene.

12. The household appliance according to claim 1, wherein the household appliance is selected from the group consisting of a dishwasher, a washing machine, a household oven, a refrigerator or tumble dryer.

13. The household appliance according to claim 1, wherein the extension is configured to removably attach to the foot plate by at least partially surrounding the foot plate.

14. The household appliance according to claim 1, wherein the foot plate comprises an first surface and a second surface opposite the first surface, and wherein the extension is configured to removably attach to the foot plate at least partially adjacent to both the first surface and the second surface.

15. The household appliance according to claim 1, wherein the extension comprises a first half and a second half, and wherein extension is configured to removably attach to the foot plate of the pedestal by closing the first half and the second half at least partially around the foot plate.

16. The household appliance according to claim 15, wherein in use the first surface of the foot plate is configured to face the household appliance.

17. The household appliance according to claim 15, wherein the first half comprises at least one tab configured to engage a corresponding receiving slot in the second half.

18. The household appliance according to claim 1, wherein the foot plate comprises an first surface and a second surface opposite the first surface, and wherein the extension is configured to removably attach to the foot plate at least partially adjacent to both the first surface and the second surface.

19. A household appliance with at least one pedestal comprising a threaded rod configured to be screwed into a corresponding threaded hole in a base of the household appliance in a longitudinal direction (A) in order to reach a desired effective height of the pedestal, characterized in that a snap nut made of a resilient material is provided having a threaded bore with a diameter and a thread fitting to the threaded rod to enable the snap nut to be screwed along a longitudinal extension of the threaded rod, the snap nut further comprising a slot having a width (B) that is less than the diameter of the bore and which defines a lateral opening of the bore wherein the width of the slot and the resiliency of the material allows the snap nut to be snapped from the side onto the threaded rod, wherein the snap nut is configured to be screwed along the threaded rod until it engages the base of the household appliance such that the threaded rod is locked against a stop face of the base of the household appliance for avoiding a swivelling (D) of the pedestal with respect to the base, wherein the snap nut comprises a cylindrical section comprising a section of the slot and being coaxial with the bore and designed to engage with the base of the household appliance and which has a tapered end which is designed to at least partially enter an entrance of the threaded hole in the base, and wherein a diameter of the cylindrical section is greater than a diameter of the entrance of the threaded hole in the base, such that the tapered end is configured to engage the entrance of the threaded hole in the base.

20. The household appliance according to claim 19, wherein the entrance is configured to receive the tapered end of the snap nut and for engaging with the tapered end, wherein the entrance is surrounded by a groove.

21. The household appliance according to claim 19, wherein the entrance is configured to receive the tapered end of the snap nut and for engaging with the tapered end, wherein the entrance is defined by a bore or sleeve provided in front of the threaded hole.

22. The household appliance according to claim 19, wherein the snap nut comprises an end being opposed to the cylindrical section and facing away from the base of the household appliance, wherein the end is a slotted butterfly nut section with two radial extensions.

23. The household appliance according to claim 22, wherein the bore and the slot extend through the cylindrical section and the manual operation facility.

\* \* \* \* \*